Nov. 10, 1936.  E. R. FAUSSET  2,060,562

CLUTCH

Filed June 17, 1935  2 Sheets-Sheet 1

INVENTOR
Ernest R. Fausset
BY
Spencer Hardman & Fehr
his ATTORNEYS

Nov. 10, 1936.   E. R. FAUSSET   2,060,562
CLUTCH
Filed June 17, 1935   2 Sheets-Sheet 2

INVENTOR
Ernest R. Fausset
BY
Spencer Hardman & Fehr
his ATTORNEYS

Patented Nov. 10, 1936

2,060,562

UNITED STATES PATENT OFFICE 2,060,562

CLUTCH

Ernest R. Fausset, Anderson, Ind., assignor to General Motors Corporation, Detroit, Mich., a corporation of Delaware Application June 17, 1935, Serial No. 26,897

14 Claims. (Cl. 192—111)

This invention relates generally to clutches for power transmission and more particularly to an improvement primarily adaptable in friction clutches.

It is well-known to incorporate in a friction clutch a movable element which is interposed between clutch shifting means and the friction members of the clutch and provides cam portions adapted to cooperate with the shifting means for forcing the members into frictional engagement with each other. To provide for initial adjustment of the clutch after mounting so that motion of the shifting means within pre-assigned limits will cause engagement or disengagement of the clutch, the element is rotatable relative to the shifting means, permitting suitable angular adjustment of the cam portions of said element relative to the shifting means. Thereafter the angularly adjusted element is locked against rotation relative to the shifting means by a key which is insertable into any one of a series of notches in the periphery of the element and couples the latter to the shifting means. Hence, the smallest possible angular adjustment of the element is limited to the angular distance between consecutive notches thereof. However, such minimum angular adjustment of the element is frequently inadequate, in which case replacement of the clutch or of parts thereof is imperative.

It is the primary object of the present invention to lock the angularly adjusted element against rotation relative to the shifting means even though the angular adjustment of the element may amount to minute fractions of the angular distance between consecutive notches thereof.

Further objects and advantages of the present invention will be apparent from the following description, reference being had to the accompanying drawings wherein a preferred embodiment of the present invention is clearly shown.

Figure 1:
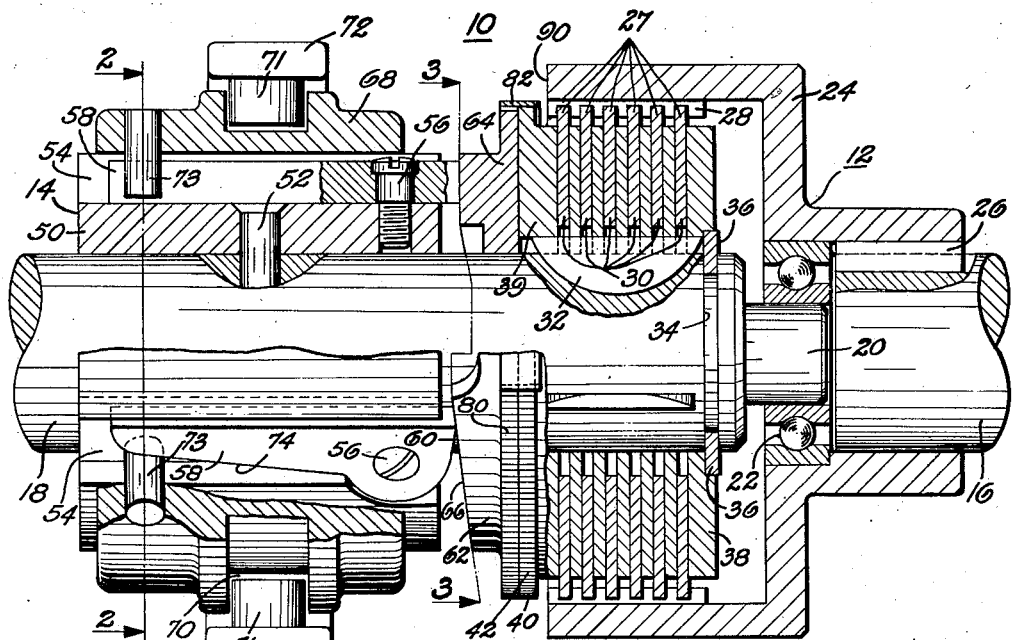
Fig. 1 is a cross sectional view of a clutch embodying the present invention, certain clutch parts being shown in elevation.
Figure 2:
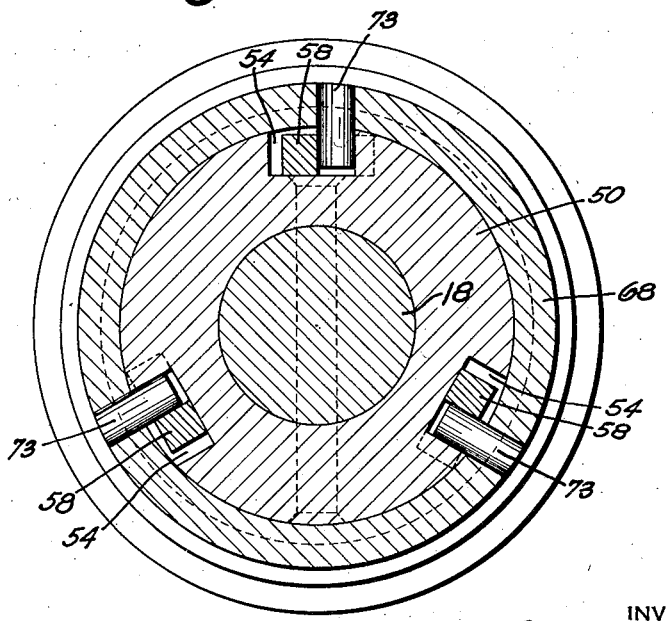
Fig. 2 is a section taken on the line 2—2 of Fig. 1.

Referring to the drawings the reference numeral 10 designates a clutch of the multiple friction disc type, having a driving clutch half 12 and a driven clutch half 14, although it is conceivable that for some reason or other clutch half 12 be the driven half and clutch half 14 be the driving half without impairing the proper operation of the clutch hereafter described. The driving clutch half 12 is mounted on a driving shaft 16 and the driven clutch half 14 is mounted on a driven shaft 18 which is in axial alignment with the driving shaft 16. The end of the driven shaft 18 is preferably provided with a cylindrical stub 20, journaled in a ball bearing 22 which is carried by a generally cup-shaped member 24, keyed at 26 to the driving shaft 16. A plurality of spaced friction discs 27 are splined at angular intervals to the member 24 as at 28. Interposed between these friction discs 27 are other friction discs 30 which are adapted to cooperate with the friction discs 27 and establish driving connection between both halves of the clutch. The friction discs 30 which are part of the driven clutch half are splined to the driven shaft 18 preferably by means of a plurality of Woodruff keys 32. The driven shaft 18 is provided with an annular groove 34, receiving two semi-annular members 36 which together form a thrust washer, preventing axial movement of a thrust ring 38 to the right beyond the position shown in Fig. 1. This ring 38 is splined to the driven shaft 18 by means of the earlier described Woodruff keys 32. Also splined to the driven shaft 18 by means of the Woodruff keys 32 is another ring 39, the periphery 40 of which is provided with equi-angularly spaced notches 42. It appears from Fig. 1 that the alternately disposed friction discs 27 and 30 of the driving and driven clutch half, respectively, are located between the two rings 38 and 39, and that upon axial movement of ring 39 to the right as viewed in Fig. 1, the friction discs 27, 30 are forced into driving engagement with each other and transmit motion from the driving shaft 16 to the driven shaft 18 as can be readily understood. The elements of the clutch which cause such axial movement of ring 39 will be described presently.

As best shown in Fig. 1, a drum 50 is pinned at 52 to the driven shaft 18. This drum 50 is provided with a plurality of equi-angularly spaced longitudinal grooves 54 each of which pivotally receives at 56 a lever 58, having a camming surface 60, adapted to cooperate with one of a plurality of cam portions 62 of a ring member 64 which is journaled on the driven shaft 18. The lobes 66 of these cam portions 62 are identical for reasons which will appear obvious later. Journaled on drum 50 is a sleeve 68, provided with an annular groove 70 adapted to receive the anti-friction rollers 71 of a conventional clutch shifter fork 72. This shifter fork may be pivotally mounted in any suitable manner and caused to rock either automatically or by manual operation. The sleeve 68 carries a plurality of pins 73 which projects into the longitudinal grooves 54 of the drum 50 and are adapted to cooperate with other camming surfaces 74 of the levers 58. It can now be understood that axial movement of sleeve 68 relative to the drum 50 results in cooperation of the pins 73 thereof with the camming surfaces 74 of the levers 58. Such cooperation results in slight rocking motion of the levers 58 about their pivotal support 56 such that the other camming surfaces 60 of these levers either cause axial movement of ring member 64 to the right as viewed in Fig. 1, or permit slight movement of said ring member to the left as shown in said figure. Hence movement of sleeve 68 to the right as shown in Fig. 1 causes driving engagement of the friction discs 27, 30 of both clutch halves through intermediation of pins 73, levers 58, ring member 64 and ring 39. Slight movement of sleeve 68 to the left as viewed in Fig. 1 permits the friction discs of both clutch halves to move out of driving engagement with each other as can be readily understood.

To provide for initial adjustment of the clutch after mounting so that slight axial movement of sleeve 68 will result in engagement or disengagement of the clutch, the ring member 64 is rotated into any one of a predetermined number of angular positions and locked therein against rotation relative to the shifting means which incorporate drum 50, sleeve 68 and levers 58. Heretofore the cam carrying member was thus locked by means of a key unalterably drivingly connected with the driven clutch half and insertable into any one of a plurality of notches in the periphery of said cam carrying member. Accordingly the smallest possible angular adjustment of the known cam carrying member is limited to the distance between two consecutive peripheral notches thereof. Quite frequently, however, such minimum adjustment is absolutely inadequate and the known clutches of this type are simply incapable of finer adjustment, wherefore replacement of the clutch or of parts thereof is frequently necessary for adaptation to existing operating conditions.

Figure 5:
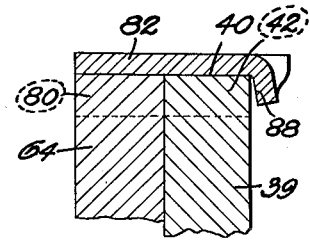
Fig. 5 is an enlarged fragmentary section taken on the line 5—5 of Fig. 3.
Figure 3:
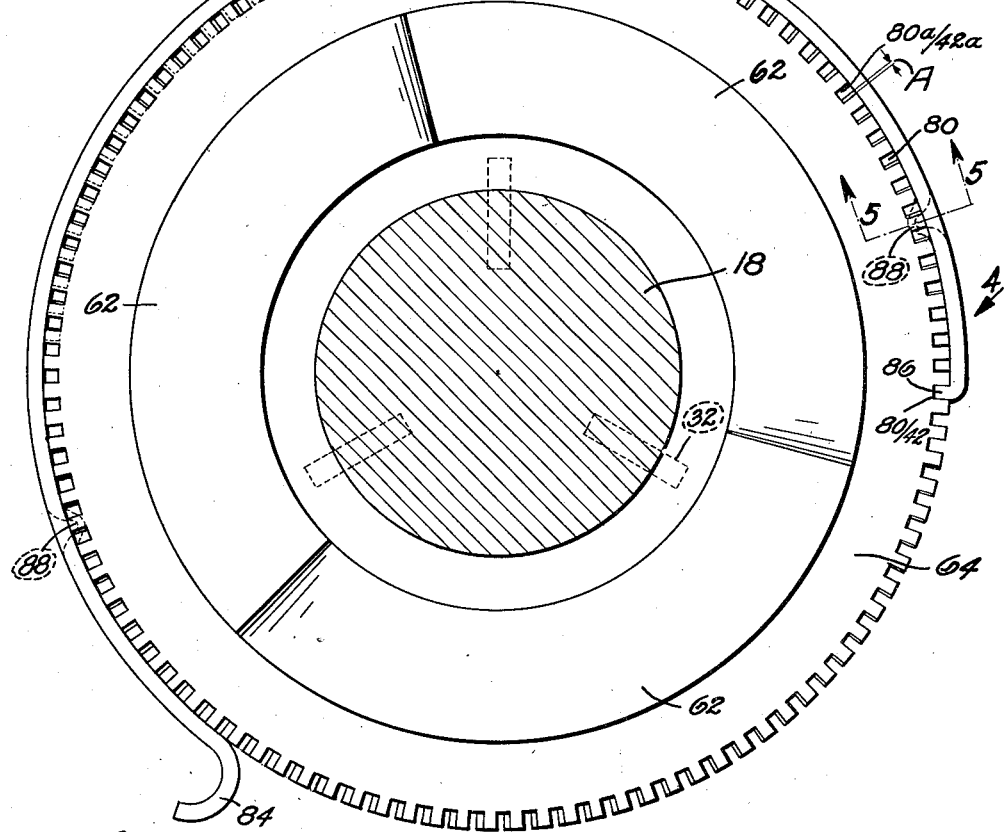
Fig. 3 is an enlarged section taken on the line 3—3 of Fig. 1.
Figure 4:
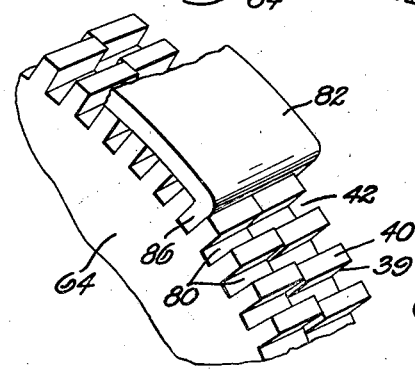
Fig. 4 is a fragmentary perspective view of certain clutch elements as viewed in the direction of arrow 4 in Fig. 3.

The present clutch has provisions for locking the cam carrying member 64 within angular distances which are only fractions of the distance between two consecutive peripheral notches 42 of ring member 39. To this end, the cam carrying member is provided with equi-angularly spaced notches 80 in the periphery thereof and of slightly different number than those of the ring member 39. In the present instance the cam carrying member 64 is shown provided with 104 peripheral notches 80 while ring 39 is then preferably provided with 103 peripheral notches 42. The locking member 82 consists preferably of a part-annular leaf spring one end of which is formed into a handle 84 and the other end of which is formed into a key 86 which is adapted to project into two aligned peripheral notches 80 and 42 of the ring members 64 and 39, respectively. The notches of both ring members are preferably of the same width so that the key 86 may be of uniform thickness. The locking member 82 is urged into engagement with the concentric, flush peripheries of both ring members 64, 39 under its own spring tension. As more particularly shown in Figs. 1 and 5, the locking member 82 extends across the peripheries of both ring members 64, 39 and at one side slightly therebeyond. Two diametrically opposite portions of the locking member 82 which extend beyond the periphery of ring member 39 are suitably deformed to provide shoulders 88, preventing axial removal of the locking member to the left as viewed in Figs. 1 and 5. Substantial removal of this locking member to the right as viewed in Fig. 1 is prevented by the adjacent face 90 of the cup-shaped member 12 as can be readily understood. To make adjustments, the locking member is unsprung from both ring members 64, 39 by manipulation of the handle portion 84 and the key 86 of said locking member is then removed from registry with the presently aligned notches 80, 42 of both ring members 64, and 39, respectively. Having thus removed the locking member 82, any required angular adjustment of the ring member 64 can be undertaken. If the necessary fine adjustment should for instance amount to 12/103 the angular distance between two consecutive notches 42 of ring member 39, the notch 80a of the cam carrying member 64 is aligned with notch 42a of ring member 39, for instance with the aid of a screw driver, and the locking member is then applied with its key 86 registering with these aligned notches. The actual angular displacement of the cam carrying member 64 is indicated in Fig. 3 as the distance A which, as already explained, is the 12/103 part of the angular distance between consecutive notches 42 of ring member 39.

It follows from the above exemplary description that the cam carrying member 64 is capable of 103 different fractional adjustments for each minimum adjustment of said member as heretofore obtained. It is of course to be understood that different numbers of notches may be provided on the ring members 64 and 39 and that either one of these members may have the greater number of notches without departing from the scope of the present invention.

While the embodiment of the present invention as herein disclosed, constitutes a preferred form, it is to be understood that other forms might be adopted, all coming within the scope of the claims which follow.

I claim:

1. In a clutch having a movable element for drivingly engaging the clutch, and means for shifting the element into clutch engaging position, the combination of an independently movable first member rotatable relative to the shifting means and having concentrically disposed, spaced deformations and a cam portion adapted to cooperate with the shifting means; another member non-rotatable relative to the shifting means and movable together with the first member, said other member having deformations concentrically of and angularly spaced differently than those of the first member, both members being adapted to transmit motion of the shifting means to the element; and means for interlocking any deformations of both members in one certain position relative to each other, thereby coupling the first member in angularly adjusted position to the other member.

2. In a clutch having a movable element for drivingly engaging the clutch, and means for shifting the element into clutch engaging position, the combination of an independently movable first member rotatable relative to the shifting means and having concentrically disposed, spaced deformations and a cam portion adapted to cooperate with the shifting means; another member non-rotatable relative to the shifting means and movable together with the first member, said other member having deformations concentrically of and angularly spaced differently than those of the first member, both members being adapted to transmit motion of the shifting means to the element; and means for interlocking radially aligned deformations of both members, thereby coupling the first member in angularly adjusted position to the other member.

3. In a clutch having a movable element for drivingly engaging the clutch, and means for shifting the element into clutch engaging position, the combination of an independently movable first member rotatable relative to the shifting means and having concentrically disposed, spaced deformations and a cam portion adapted to cooperate with the shifting means; another member non-rotatable relative to the shifting means and movable together with the first member, said other member having deformations angularly spaced differently than and disposed circularly congruently with the circular disposition of the deformations of the first member, both members being adapted to transmit motion of the shifting means to the element; and means for interlocking any deformations of both members in one certain position relative to each other, thereby coupling the first member in angularly adjusted position to the other member.

4. In a clutch having a movable element for drivingly engaging the clutch, and means for shifting the element into clutch engaging position, the combination of an independently movable first cylindrical member rotatable relative to the shifting means and having spaced peripheral notches and a cam portion adapted to cooperate with the shifting means; another member having its periphery concentric of that of the first member and being non-rotatable relative to the shifting means and movable together with the first member, said other member having peripheral notches angularly spaced differently than those of the first member, both members being adapted to transmit motion of the shifting means to the element; and means for interlocking any notches of both members in one certain position relative to each other, thereby coupling the first member in angularly adjusted position to the other member.

5. In a clutch having a movable element for drivingly engaging the clutch, and means for shifting the element into clutch engaging position, the combination of an independently movable first cylindrical member rotatable relative to the shifting means and having spaced peripheral notches and a cam portion adapted to cooperate with the shifting means; another member having its periphery concentric of that of the first member and being non-rotatable relative to the shifting means and movable together with the first member, said other member having peripheral notches angularly spaced differently than those of the first member, both members being adapted to transmit motion of the shifting means to the element; and means for interlocking radially aligned notches of both members, thereby coupling the first member in angularly adjusted position to the other member.

6. In a clutch having a movable element for drivingly engaging the clutch, and means for shifting the element into clutch engaging position, the combination of an independently movable first cylindrical member rotatable relative to the shifting means and having spaced peripheral notches and a cam portion adapted to cooperate with the shifting means; another cylindrical member of the same diameter as the first member and disposed concentrically thereof and being non-rotatable relative to the shifting means and movable together with the first member, said other member having peripheral notches angularly spaced differently than those of the first member, both members being adapted to transmit motion of the shifting means to the element; and means for interlocking any notches of both members in one certain position relative to each other, thereby coupling the first member in angularly adjusted position to the other member.

7. In a clutch having a movable element for drivingly engaging the clutch, and means for shifting the element into clutch engaging position, the combination of an independently movable first cylindrical member rotatable relative to the shifting means and having spaced peripheral notches and a cam portion adapted to cooperate with the shifting means; another cylindrical member of the same diameter as the first member and disposed concentrically thereof and being non-rotatable relative to the shifting means and movable together with the first member, said other member having peripheral notches angularly spaced differently than those of the first member, both members being adapted to transmit motion of the shifting means to the element; and a key insertable in any aligned notches of both members for coupling the first member in angularly adjusted position to the other member.

8. In a clutch having a movable element for drivingly engaging the clutch, and means for shifting the element into clutch engaging position, the combination of an independently movable first cylindrical member rotatable relative to the shifting means and having spaced peripheral notches and a cam portion adapted to cooperate with the shifting means; another cylindrical member of the same diameter as the first member and disposed concentrically thereof and being non-rotatable relative to the shifting means and movable together with the first member, said other member having peripheral notches of the same width as those of the first member but being spaced differently than the notches of said first member, both members being adapted to transmit motion of the shifting means to the element; and a key insertable in any aligned notches of both members for coupling the first member in angularly adjusted position to the other member.

9. In a clutch having a movable element for drivingly engaging the clutch, and means for shifting the element into clutch engaging position, the combination of an independently movable first cylindrical member rotatable relative to the shifting means and having spaced peripheral notches and a cam portion adapted to cooperate with the shifting means; another cylindrical member disposed concentrically of the first member and being non-rotatable relative to the shifting means and movable together with the first member, said other member having peripheral notches angularly spaced differently than those of the first member, both members being adapted to transmit motion of the shifting means to the element; and means yieldingly embracing the peripheries of both members and providing a key insertable into radially aligned notches of both members, thereby coupling the first member in angularly adjusted position to the other member.

10. In a clutch having a movable element for drivingly engaging the clutch, and means for shifting the element into clutch engaging position, the combination of an independently movable first cylindrical member rotatable relative to the shifting means and having spaced peripheral notches and a cam portion adapted to cooperate with the shifting means; another cylindrical member disposed concentrically of the first member and being non-rotatable relative to the shifting means and movable together with the first member, said other member having peripheral notches angularly spaced differently than those of the first member, both members being adapted to transmit motion of the shifting means to the element; and means yieldingly embracing the peripheries of both members said embracing means providing spaced shoulders engaging a member to prevent axial removal of said means, and a key insertable into radially aligned notches of both members, thereby coupling the first member in angularly adjusted position to the other member.

11. In a clutch having a movable element for drivingly engaging the clutch, and means for shifting the element into clutch engaging position, the combination of an independently movable first cylindrical member rotatable relative to the shifting means and having spaced peripheral notches and a cam portion adapted to cooperate with the shifting means; another cylindrical member disposed concentrically of the first member and being non-rotatable relative to the shifting means and movable together with the first member, said other member having peripheral notches angularly spaced differently than those of the first member, both members being adapted to transmit motion of the shifting means to the element; and means yieldingly embracing the peripheries of both members, said embracing means providing a key insertable into radially aligned notches of both members, thereby coupling the first member in angularly adjusted position to the other member, and a handle for removing said embracing means from the members.

12. In a clutch having a movable element for drivingly engaging the clutch, and means for shifting the element into clutch engaging position, the combination of an independently movable first cylindrical member rotatable relative to the shifting means and having spaced peripheral notches and a cam portion adapted to cooperate with the shifting means; another cylindrical member disposed concentrically of the first member and being non-rotatable relative to the shifting means and movable together with the first member, said other member having peripheral notches angularly spaced differently than those of the first member, both members being adapted to transmit motion of the shifting means to the element; and means yieldingly embracing the peripheries of both members, said embracing means providing a key insertable into radially aligned notches of both members, thereby coupling the first member in angularly adjusted position to the other member, spaced shoulders engaging a member to prevent axial removal of said embracing means and a handle for removing said embracing means radially from both members.

13. In a clutch having a movable element for drivingly engaging the clutch, and means for shifting the element into clutch engaging position, the combination of an independently movable first cylindrical member rotatable relative to the shifting means and having spaced peripheral notches and a cam portion adapted to cooperate with the shifting means; another cylindrical member disposed concentrically of the first member and being non-rotatable relative to the shifting means and movable together with the first member, said other member having peripheral notches angularly spaced differently than those of the first member, both members being adapted to transmit motion of the shifting means to the element; and means yieldingly embracing the peripheries of both members, one end of said embracing means providing a key insertable into radially aligned notches of both members, thereby coupling the first member in angularly adjusted position to the other member, and the other end thereof providing a handle for removing said embracing means from both members.

14. In a clutch having a movable element for drivingly engaging the clutch, and means for shifting the element into clutch engaging position, the combination of an independently movable first cylindrical member rotatable relative to the shifting means and having a pre-assigned member of equi-angularly spaced notches in its periphery and a cam portion adapted to cooperate with the shifting means; another cylindrical member of substantially the same diameter as the first member and disposed concentrically thereof and being non-rotatable relative to the shifting means and movable together with the first member, said other member having equi-angularly spaced notches in its periphery numbering one less than those of the first member, both members being adapted to transmit motion of the shifting means to the element; and means for interlocking radially aligned notches of both members, thereby coupling the first member in angularly adjusted position to the other member.

ERNEST R. FAUSSET.